United States Patent
Ogihara

(10) Patent No.: US 6,868,051 B2
(45) Date of Patent: Mar. 15, 2005

(54) OPTICAL DISK DRIVE, AND METHOD FOR IDENTIFYING OPTICAL DISKS MOUNTED THERETO

(75) Inventor: Koichiro Ogihara, Tokyo (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 09/957,935

(22) Filed: Sep. 21, 2001

(65) Prior Publication Data

US 2002/0075780 A1 Jun. 20, 2002

(30) Foreign Application Priority Data

Sep. 22, 2000 (JP) .................................. 2000-289348

(51) Int. Cl.$^7$ ................................................ G11B 7/00
(52) U.S. Cl. ................. 369/53.2; 369/53.23; 369/47.48
(58) Field of Search .................... 369/44.26, 44.32, 369/44.13, 53.23, 53.1, 53.2, 47.27, 53.31, 47.48

(56) References Cited

U.S. PATENT DOCUMENTS 5,764,610 A   6/1998  Yoshida et al.
6,188,657 B1 * 2/2001  Kim et al. ................ 369/53.11

FOREIGN PATENT DOCUMENTS

EP    0 874 356    10/1998
EP    0 938 084    8/1999

* cited by examiner

Primary Examiner—Nabil Hindi
(74) Attorney, Agent, or Firm—Frommer Lawrence & Haug LLP; William S. Frommer

(57) ABSTRACT

The frequency components of the groove wobbles of disks are extracted from push-pull signals $S_{PP}$ by first and second filters in a wobble detecting section. The wobble detecting section supplies to the controller the detection levels of the frequency components. The controller identifies the kind of the mounted optical disks based on the detection levels.

11 Claims, 4 Drawing Sheets

(DVD−RW)

(DVD+RW)

(DVD−ROM)

OPTICAL DISK DRIVE, AND METHOD FOR IDENTIFYING OPTICAL DISKS MOUNTED THERETO

BACKGROUND OF THE INVENTION

1. Field of the Invention

The present invention relates to an optical disk drive to which optical disks having different disk formats from each other are mounted, and a method for identifying optical disks. Specifically, the present invention relates to an optical disk drive and the like in which plural frequency components corresponding to the frequencies of the groove wobbles of plural kinds of recording-capable optical disks are respectively extracted from the signals corresponding to the groove wobbles reproduced from the mounted optical disks, and based on the extracted plural frequency components, it is identified whether or not the mounted disks are recording-capable optical disks, thereby identifying accurately in a short time whether or not the mounted optical disks are recording-capable optical disks.

2. Description of the Related Art

As DVD-type optical disks, suggested are recording-capable optical disks such as DVD-R disks as write-once type disk and DVD-RW disks and DVD+RW disks as rewritable optical disks, as well as reproduction only optical disks such as DVD-ROM disks. These DVD-type optical disks are defined to have a diameter of 12 cm, and are in an identical outside shape. As DVD-type optical disk drives, there are optical disk recording and reproducing apparatuses for recording and reproduction, and optical disk reproducing apparatuses only for reproduction.

As described above, since the DVD-type optical disks are in an identical outer shape, several kinds of optical disks different in characteristics and the like are mounted to the DVD-type optical disk recording and reproducing apparatuses and the optical disk reproducing apparatuses described above. In this situation, each of the apparatuses is required to identify the mounted optical disk, and to handle the mounted optical disk based on the result of the identification.

For example, when mounted to the optical disk drive is a recording-capable optical disk on which a duplication inhibited digital video signal has been recorded neglecting the duplication inhibition, the optical disk drive identifies the optical disk as a recording-capable optical disk, and does not reproduce the recorded digital video signal.

SUMMARY OF THE INVENTION

The objective of the present invention is to provide an optical disk drive and the like capable of identifying accurately in a short time whether or not the optical disks mounted thereto is recording-capable optical disk.

An optical disk drive according to the present invention includes: wobble signal reproduction means of reproducing, in the state where each of mounted disks is rotated at a predetermined rotation speed, a signal corresponding to a groove wobble from a predetermined position in a radical direction of the optical disk; plural filter means of extracting each of plural frequency components corresponding to the frequencies of the groove wobbles of the plural kinds of recording-capable optical disks; and disk identification means of identifying whether or not each of the mounted optical disk is a recording-capable optical disk, based on the output signals from the plural filter means.

A method for identifying optical disks in the optical disk drive according to the present invention, includes the steps of: reproducing, in the state where each of mounted optical disks is rotated at a predetermined rotation speed, a signal corresponding to a groove wobble from a predetermined position in a radical direction of the optical disk; extracting each of plural frequency components corresponding to the frequencies of the groove wobbles of the plural kinds of recording-capable optical disks; and identifying whether or not each of the mounted optical disks is a recording-capable optical disk, based on extracted plural frequency components.

In the above-described manner, the plural frequency components corresponding to the frequencies of the groove wobbles of the plural kinds of recording-capable optical disks are respectively extracted from the signals corresponding to the groove wobbles reproduced from the mounted optical disks, and based on the extracted plural frequency components, it is possible to identify accurately in a short time whether or not the mounted optical disks are recording-capable optical disks.

DESCRIPTION OF THE PREFERRED EMBODIMENT

Figure 1:
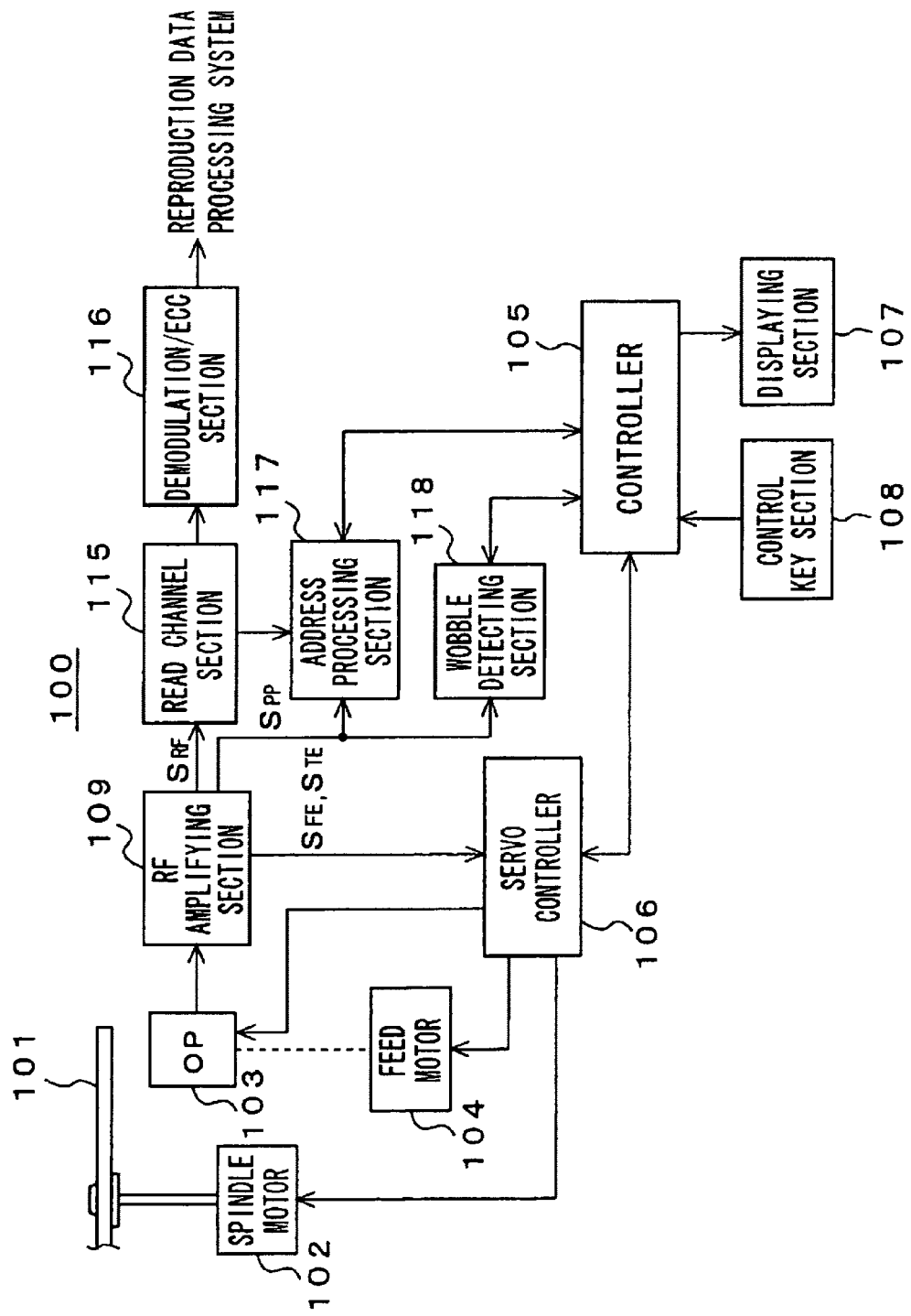
FIG. 1 a block diagram showing a partial structure of an optical disk.

Hereinafter, embodiments of the present invention will be described with reference to drawings. FIG. 1 shows a partial structure of an optical disk drive 100 to which a DVD-type optical disk can be mounted.

The drive 100 includes: a spindle motor 102 for driving the mounted optical disk 101 to rotate; an optical pickup 103 provided with a semiconductor laser, an object glass, a photodetector and the like; and a feed motor 104 for shifting the optical pickup 103 toward a radial direction of the optical disk 101. In this case, the laser beam from the semiconductor laser which constitutes the optical pickup 103 is irradiated onto the recording surface of the optical disk 101, and the light reflected from the recording surface (i.e. the returned light) is irradiated onto the photodetector which constitutes the optical pickup 103.

The drive 100 also includes: a controller 105 for controlling the operations of the entire drive; and a servo controller 106. To the controller 105, connected are a displaying section 107 constituted by a liquid crystal element and the like, and a control key section 108 provided with plural control keys. The servo controller 106 controls the tracking and focus at the optical pickup 103, and also controls the operation of the feed motor 104. The servo controller 106 also controls the rotation of the spindle motor 102. The optical disk 101 is driven to rotate at a constant linear velocity (CLV) at the time of recording and reproducing.

The drive 100 further includes an RF amplifying section 109 for processing an output signal from the photodetector which constitutes the optical pickup 103 so as to produce a reproduction RF signal $S_{RF}$, a focus error signal $S_{FE}$, a tracking error signal $S_{TE}$, and a push-pull signal $S_{PP}$. In this case, the focus error signal $S_{FE}$ is produced in an astigma method (i.e. an astigmatism method). The tracking error signal $S_{TE}$ is produced by a DPD method (i.e. a digital phase difference method) when reproduced, and is produced by a push-pull method when recorded.

The focus error signal $S_{FE}$ and the tracking error signal $S_{TE}$ which are produced in the RF amplifying section 109 are supplied to the servo controller 106. The servo controller 106 controls the tracking and focus at the optical pickup 103 by use of these error signals as described above.

Figure 2:
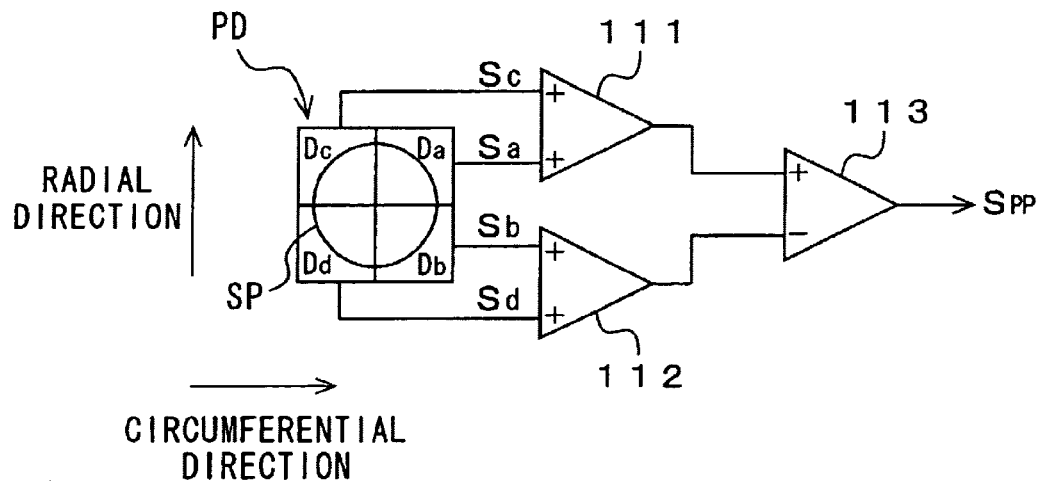
FIG. 2 is a diagram for illustrating the production of push-pull signal.

As the photodetector which constitutes the optical pickup 103, a quadrant photodetector PD is used as shown in FIG. 2. In the photodetector PD, a spot SP is formed by the light returned from the optical disk 101. Defining detection signals of four photodiodes Da to Dd which constitute together the photodetector PD as Sa to Sd, the push-pull signal $S_{PP}$ can be obtained from the following calculation.

Specifically, the detection signals Sa, Sc are added in an adder 111, and simultaneously, the detection signals Sb, Sd are added in an adder 112. Then, a subtracter 113 subtracts an output signal from the adder 112 from the output signal from the adder 111 to obtain the push-pull signal $S_{PP}$.

Returning to FIG. 1, the drive 100 also includes: a read channel section 115 for performing a series of analog signal processings including the binary slice for the reproduction RF signal produced in the RF amplifying section 109, the production of synchronous data by the subsequent phase-locked loop (PLL), and the like; and a demodulation/ECC section 109 for performing processings including the demodulation of the synchronous data (8/16 modulation data) produced in the read channel section 108, the subsequent error correction, and the like. The output data from the demodulation/ECC section 109 is supplied to an unillustrated reproduction data processing system.

The drive 100 further includes an address processing section 117. The address processing section 117 transfers to the controller 115 the address information extracted from the reproduction RF signal $S_{RF}$ in the read channel section 115. The address processing section 117 also processes the push-pull signal $S_{PP}$ to obtain address information, and transfers the address information to the controller 105.

Figure 3:
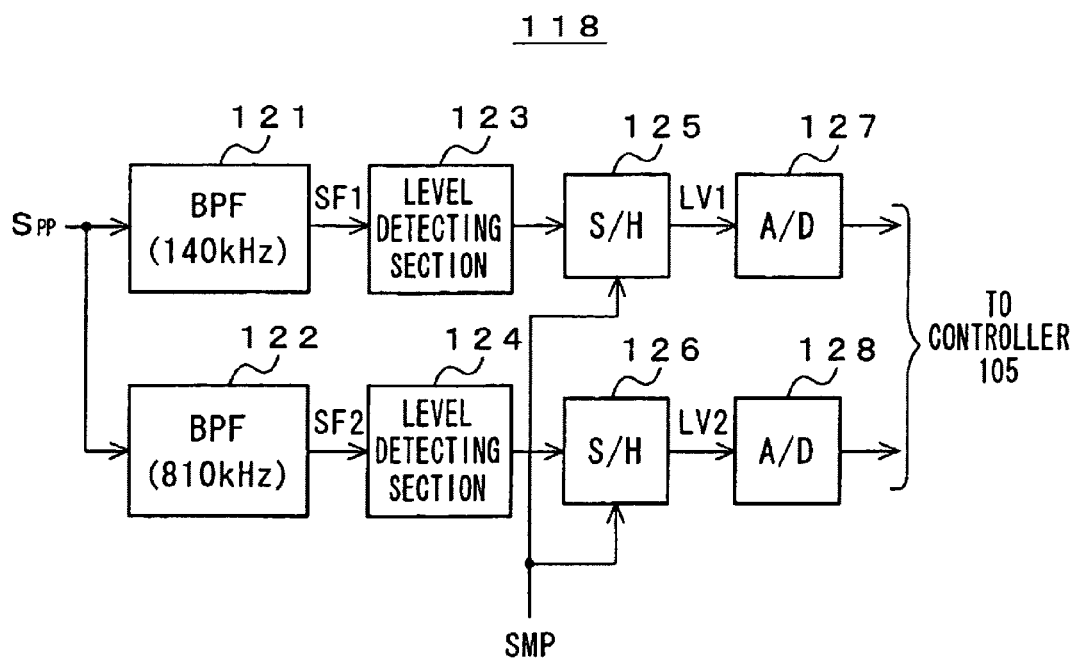
FIG. 3 is a block diagram showing a structure of a wobble detecting section.

The drive 100 also includes a wobble detection section 118 for detecting wobble signals from the push-pull signal $S_{PP}$ produced in the RF amplifying section 109. FIG. 3 shows a structure of the wobble detecting section 118.

The wobble detecting section 118 includes a first bandpass filter 121 having a center frequency f1 of 140 kHz, and a second bandpass filter 122 having a center frequency f2 of 810 kHz.

In the case where the optical disk 101 is a DVD–RW disk as an optical disk of a first kind, if the optical disk 101 is driven to rotate at a rotation speed of 1389 rpm, the frequency of the groove wobble at the position of 24 mm in a radial direction thereof is about 140 kHz. Therefore, the push-pull signal $S_{PP}$ in this case has high level of frequency component of about 140 kHz.

In the case where the optical disk 101 is a DVD+RW disk as an optical disk of a second kind, if the optical disk 101 is driven to rotate at a rotation speed of 1389 rpm, the frequency of the groove wobble at the position of 24 mm in a radial direction thereof is about 810 kHz. Therefore, the push-pull signal $S_{PP}$ in this case has high level of frequency component of about 810 kHz.

The wobble detecting section 118 includes: a first level detecting section 123 for detecting the amplitude level of the output signal SF1 from the first bandpass filter 121; and a second level detecting section 124 for detecting the amplitude level of the output signal SF2 from the second bandpass filter 122. Each of these first and second level detecting sections 123, 124 is constituted by a rectifying and smoothing circuit, for example.

The wobble detecting section 118 includes: a first sample hold circuit 125 for sampling the output signal from the first level detecting section 123 by a sample pulse SMP supplied from the controller 105 at a predetermined timing and then for holding the sample value as a detection level LV1; and a second sample hold circuit 126 for sampling the output signal from the second level detecting section 124 by the above-described sample pulse SMP and then for holding the sample value as a detection level LV2.

The wobble detecting section 118 further includes: a first A/D converter 127 for converting the detection level LV1 held in the first sample hold circuit 125 into a digital signal, and then for supplying thus-produced digital signal to the controller 105; and a second A/D converter 128 for converting the detection level LV2 held in the second sample hold circuit 126 into a digital signal, and then for supplying thus-produced digital signal to the controller 105.

Hereinafter, the operation of identifying the disk in the optical disk drive 100 shown in FIG. 1 will be described. When the optical disk 101 is mounted, the controller 105 identifies whether the optical disk 101 is a recording-capable disk, that is, a DVD–RW disk as a disk of a first kind, a DVD+RW disk as a disk of a second kind, or a reproduction only disk, i.e. a DVD-ROM disk as a disk of a third kind.

In this case, the controller 105 controllers the servo controller 106 to shift the optical pickup 103 to the position of 24 mm in a radial direction of the optical disk 101, to drive the optical disk 101 to rotate at a rotation speed 1389 rpm, to operate the optical pickup 103 to produce a laser beam by the semiconductor laser, and furthermore, to perform servo of focus and tracking. In this state, the push-pull signal $S_{PP}$ produced in the RF amplifying section 109 is supplied to the wobble detecting section 118. The wobble detecting section 118 processes the push-pull signal $S_{PP}$ to produce the detection levels LV1, LV2, and supplies the detection levels LV1, LV2 to the controller 105.

Specifically, the first bandpass filter 121 extracts the frequency component of about 140 kHz from the push-pull signal $S_{PP}$. The first level detecting section 123 detects the amplitude level of the output signal SF1 from the first filter 121. The first sample hold circuit 125 samples the output signal from the first level detecting section 123 to obtain the detection level LV1. Then, the first A/D converter 127 converts the detection level LV1 into the digital signal, and supplies thus-produced digital signal to the controller 105.

Similarly, the second bandpass filter 122 extracts the frequency component of about 810 kHz from the push-pull signal $S_{PP}$. The second level detecting section 124 detects the amplitude level of the output signal SF2 from the second filter 122. Then, the second sample hold circuit 126 samples the output signal from the second level detecting section 124 to obtain the detection level LV2. The second A/V converter 128 converts the detection level LV2 into the digital signal, and supplies thus-produced digital signal to the controller 105.

The controller 105 performs the identification of the mounted optical disk in the following manner by use of the detection levels LV1, LV2. Specifically, in the case where the relationship of LV1>LV2 is established and the LV1 is at a predetermined level or higher, the mounted optical disk 101 is identified as a DVD–RW disk which is a recording-capable disk of a first kind. In the case where the relationship of LV1>LV2 is established and the LV2 is at a predetermined level or higher, the mounted optical disk 101 is identified as a DVD+RW disk which is a recording capable disk of a second kind. Furthermore, in the case where both the LV1 and LV2 are smaller than predetermined levels, the mounted optical disk 101 is identified as a DVD-ROM disk which is reproduction only disk of a third kind. The results of such identifications are displayed on the displaying section 107 through the control by the controller 105, so as to be announced to the user.

Figure 4A:
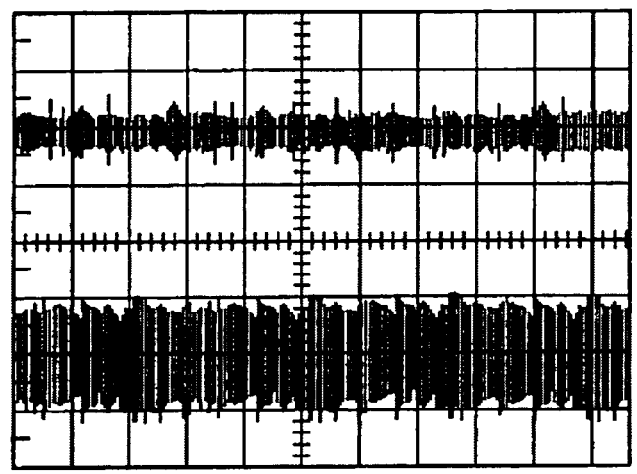
FIGS. 4A to 4B are the diagram showing an output signal from a bandpass filter at the time when each of a DVD-RW disk, a DVD+RW disk, and a DVD-ROM disk is mounted.

In the case where a DVD–RW disk which is a disk of a first kind is mounted as the optical disk 101, the push-pull signal $S_{PP}$ has high level of frequency component of about 140 kHz. Therefore, the output signal SF1 from the first bandpass filter 121 and the output signal SF2 from the second bandpass filter 122 are obtained as shown in FIG. 4A (for example, SF1 is 180 mVp-p, and SF2 is 30 mVp-p). In this case, the relationship of LV1>LV2 is established and the LV1 is at a predetermined level or higher (for example, the predetermined level is a level corresponding to 100 mVp-p). Consequently, the mounted disk is identified as a DVD–RW disk.

Figure 4B:
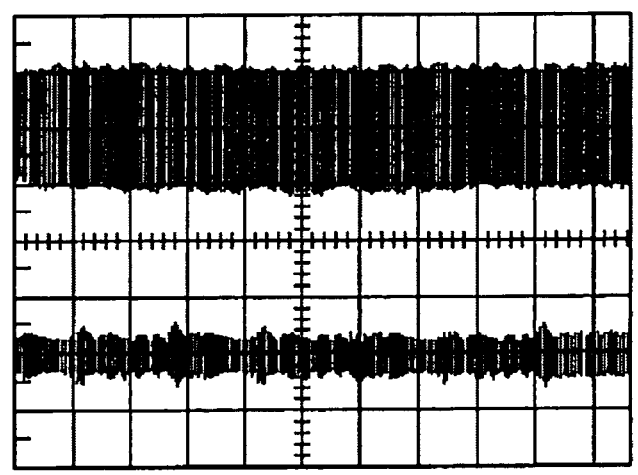

In the case where a DVD+RW disk which is a disk of a second kind is mounted as the optical disk 101, the push-pull signal $S_{PP}$ has high level of frequency component of about 810 kHz. Therefore, the output signal SF1 from the first bandpass filter 121 and the output signal SF2 from the second bandpass filter 122 are obtained as shown in FIG. 4B (for example, SF1 is 30 mVp-p, and SF2 is 200 mVp-p). In this case, the relationship of LV2>LV1 is established and the LV2 is at a predetermined level or higher. Consequently, the mounted disk is identified as a DVD+RW disk.

Figure 4C:
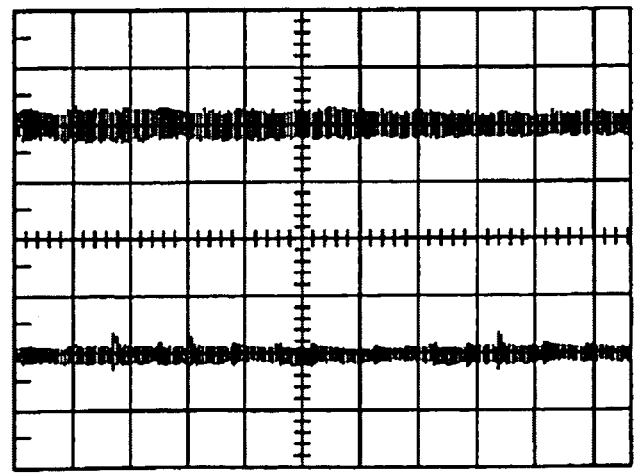

In the case where a DVD-ROM disk which is a disk of a third kind is mounted as the optical disk 101, the push-pull signal $S_{PP}$ has small level of frequency components of about 140 kHz and about 810 kHz. Therefore, the output signal SF1 from the first bandpass filter 121 and the output signal SF2 from the second bandpass filter 122 are obtained as shown in FIG. 4C. In this case, both the LV1 and LV2 are smaller than predetermined levels. Consequently, the mounted disk is identified as a DVD-ROM disk.

As has been described above, in the embodiment of the present invention, the first and second bandpass filters 121, 122 in the wobble detecting section 118 extract frequency components of the groove wobbles of the DVD–RW disk and the DVD+RW disk respectively from the push-pull signal $S_{PP}$. Then, the wobble detecting signal 118 supplies to the controller 105 the detection levels LV1, LV2 corresponding to the amplitude levels of the respective frequency components. The controller 105 identifies the mounted optical disk 101, based on the detection levels LV1, LV2.

Therefore, in the embodiment of the present invention, identification whether or not the mounted optical disk 101 is a DVD–RW disk, and identification whether or not the mounted optical disk 101 is a 11 DVD+RW disk are simultaneously conducted. In this manner, identification whether or not the mounted optical disk 101 is a recording capable optical disk (i.e., a DVD–RW disk, a DVD+RW disk) can be conducted accurately in a short time. Due to this arrangement, even if duplication inhibited digital video signal is recorded in a recording-capable disk neglecting the duplication inhibition, this state can be acknowledged immediately.

In addition, in the embodiment of the present invention, when the mounted optical disk 101 is a recording-capable optical disk, the kind of the disk can be known simultaneously. Due to this arrangement, the possibility of erroneous recording into not-corresponding optical disk can be lowered.

Figure 5:
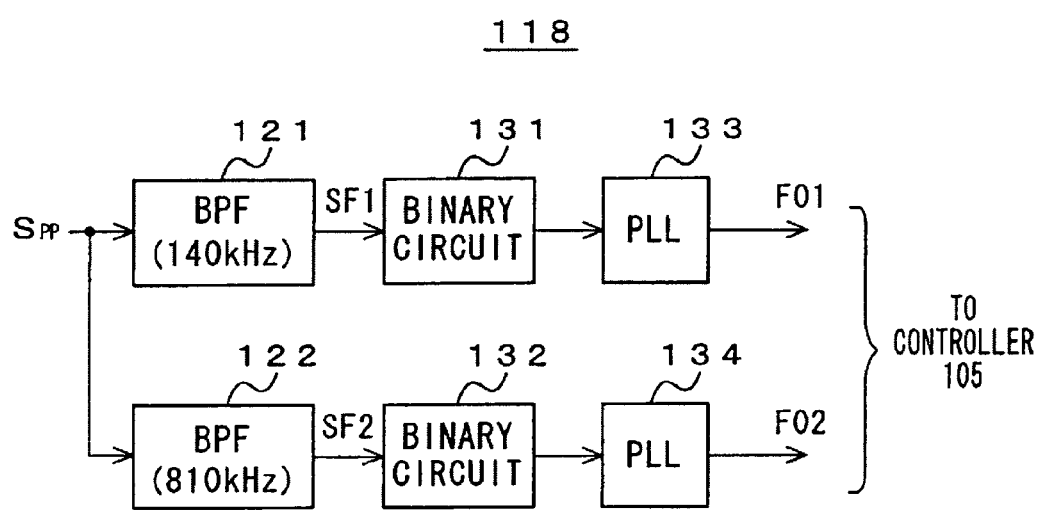
FIG. 5 is a block diagram showing another structure of a wobble detecting section.

In the embodiment described above, the wobble detecting section 118 has a structure such as shown in FIG. 3. Alternatively, the wobble detecting section 118 may have a structure such as shown in FIG. 5. In FIG. 5, the constituent elements identical to those of FIG. 3 are denoted by the same reference numerals, and descriptions thereof will be omitted.

As is the case of the wobble detecting section 118 shown in FIG. 3, the wobble detecting section 118 includes: a first bandpass filter 121 having a center frequency f1 of 140 kHz; and a second bandpass filter 122 having a center frequency f2 of 810 kHz.

The wobble detecting section 118 also includes: a first binary circuit 131 for binarizing the output signal SF1 from the first bandpass filter 121; a second binary circuit 132 for binarizing the output signal SF2 from the second bandpass filter 122; a first PLL circuit 133 for producing a frequency signal FO1 using the binary signal from the first binary circuit 131 as a reference signal, and then for supplying the frequency signal FO1 to the controller 105; and a second PLL circuit 134 for producing a frequency signal FO2 using the binary signal from the second binary circuit 132 as a reference signal, and then for supplying the frequency signal FO2 to the controller 105.

At the time of identifying the mounted optical disk 101, the wobble detecting section 118 processes the push-pull signal $S_{PP}$ to produce the frequency signals FO1, FO2, and supplies the frequency signals FO1, FO2 to the controller 105.

Specifically, the first bandpass filter 121 extracts the frequency component of about 140 kHz from the push-pull signal $S_{PP}$. Then, the first binary circuit 131 binarizes the output signal SF1 from the first filter 121. The binary signal from the first binary circuit 131 is supplied to the first PLL circuit 133 as a reference signal. Then, the frequency signal FO1 output from the first PLL circuit 133 is supplied to the controller 105.

In this case, when the frequency component of about 140 kHz of the output signal SF1 from the first bandpass filter 121 is at high level, the binary signal supplied to the first PLL circuit 133 has a single frequency of about 140 kHz. As a result, a frequency signal of about 140 kHz can be obtained as a frequency signal FO1. Contrary to this, when the frequency component of about 140 kHz of the output signal SF1 from the first bandpass filter 121 is at low level, the binary signal supplied to the first PLL circuit 133 does not has a single frequency of about 140 kHz because of noise components. As a result, it is impossible to obtain a frequency signal of about 140 kHz as a frequency signal FO1.

Similarly, the second bandpass filter 122 extracts the frequency component of about 810 kHz from the push-pull signal $S_{PP}$. Then, the second binary circuit 132 binarizes the output signal SF1 from the second filter 122. The binary signal from the second binary circuit 132 is supplied to the second PLL circuit 134 as a reference signal. Then, the frequency signal FO2 output from the second PLL circuit 134 is supplied to the controller 105.

In this case, when the frequency component of about 810 kHz of the output signal SF1 from the second bandpass filter 122 is at high level, the binary signal supplied to the second PLL circuit 134 has a single frequency of about 810 kHz. As a result, a frequency signal of about 810 kHz can be obtained as a frequency signal FO2. Contrary to this, when the frequency component of about 810 kHz of the output signal SF2 from the second bandpass filter 122 is at low level, the binary signal supplied to the second PLL circuit 134 does not has a single frequency of about 810 kHz because of noise components. As a result, it is impossible to obtain a frequency signal of about 810 kHz as a frequency signal FO2.

The controller 105 performs the identification of the mounted optical disk 101 in the following manner by use of the frequency signals FO1, FO2. Specifically, in the case where the frequency signal FO1 is a frequency signal of about 140 Hz, the mounted optical disk 101 is identified as a DVD−RW disk which is a recording-capable disk. In the case where the frequency signal FO2 is a frequency signal of about 810 kHz, the mounted optical disk 101 is identified as a DVD+RW disk which is a recording-capable disk. Furthermore, in the case where the frequency signal FO1 is not a frequency signal of about 140 kHz and the frequency signal FO2 is not a frequency signal of about 810 kHz, the mounted optical disk 101 is identified as a DVD-ROM disk which is a reproduction only disk.

For example, the controller 105 determines the frequencies of the frequency signals FO1, FO2 by counting the periods of the frequency signals FO1, FO2 by use of a clock with crystal quartz accuracy. For example, when the periods of the frequency signals FO1, FO2 are counted by a clock of 100 MHz and the counted value falls within the range of 118 to 129, the frequency of the frequency signal FO2 falls within the range of 775.2 kHz to 847.5 kHz. Since this value is ±5% of 810 kHz, the controller 105 determines that the frequency of the frequency signal FO2 is about 810 kHz. The reason why the deviation of ±5% is allowed is to accommodate the deviations in the position where the measurement is conducted, the number of rotations, and the like in the optical disk 101. Although detailed values are not shown, the deviation of ±5% is similarly allowed in the case of determining the frequency of the frequency signal FO1.

When a DVD−RW disk is mounted as the optical disk 101, the push-pull signal $S_{PP}$ has high level of the frequency component of about 140 kHz. Therefore, the output signal SF1 from the first bandpass filter 121 and the output signal SF2 from the second bandpass filter 122 are obtained as shown in FIG. 4A. In this case, since the frequency signal FO1 is a frequency signal of about 140 kHz, the mounted optical disk is identified as a DVD−RW disk.

When a DVD+RW disk is mounted as the optical disk 101, the push-pull signal $S_{PP}$ has high level of the frequency component of about 810 kHz. Therefore, the output signal SF1 from the first bandpass filter 121 and the output signal SF2 from the second bandpass filter 122 are obtained as shown in FIG. 4B. In this case, since the frequency signal FO2 is a frequency signal of about 810 kHz, the mounted optical disk is identified as a DVD+RW disk.

When a DVD-ROM disk is mounted as the optical disk 101, the push-pull signal $S_{PP}$ has low level of the frequency component of about 140 kHz and about 810 kHz. Therefore, the output signal SF1 from the first bandpass filter 121 and the output signal SF2 from the second bandpass filter 122 are obtained as shown in FIG. 4C. In this case, since the frequency signal FO1 is not a frequency signal of about 140 kHz, and the frequency signal FO2 is not a frequency signal of about 810 kHz, the mounted optical disk is identified as a DVD-ROM disk.

In the embodiment described above, identifications of two-kinds of recording-capable optical disks (DVD−RW, DVD+RW) are simultaneously conducted. Similarly, identifications of plural kinds of recording-capable optical disks can be conducted simultaneously. In this case, however, the plural kinds of optical disks are required to have different frequencies of groove wobbles from each other.

In the embodiment described above, the present invention has been applied to DVD-type optical disk drive 100. It is obvious that the present invention is also applicable to CD-type optical disk drives.

According to the invention, the plural frequency components corresponding to the frequencies of the groove wobbles of the plural kinds of recording-capable optical disks are respectively extracted from the signals corresponding to the groove wobbles reproduced from the mounted optical disks, and based on the extracted plural frequency components, it is identified whether or not the mounted optical disks are recording-capable optical disks. The identification whether or not the mounted optical disks are recording-capable optical disks can be conducted accurately in a short time.

What is claimed is:

1. An optical disk drive comprising:
    wobble signal reproduction means of reproducing, in the state where each of mounted optical disks is rotated at a predetermined rotation speed, a signal corresponding to groove wobbles from a predetermined position in a radical direction of the optical disk;
    plural filter means of extracting each of plural frequency components corresponding to the frequencies of the groove wobbles of the plural kinds of recording-capable optical disks; and
    disk identification means for identifying a kind of the mounted optical disk, based on the output signals from the plural filter means.

2. The optical disk drive according to claim 1, wherein the disk identification means comprising:
    plural level detecting sections for detecting a level of each of the output signals from the plural filter means; and
    an identifying section for identification using the detection signals from the plural level detecting sections.

3. The optical disk drive according to claim 1, wherein the disk identification means comprising:
    plural PLL circuit sections to which each of the output signals from the plural filter means are supplied as reference signals; and
    an identifying section for identification using the output signals from the plural PLL circuit sections.

4. The optical disk drive according to claim 1, wherein the disk identification means identifies whether or not the mounted optical disk is a recording-capable optical disk, based on the output signals from the plural filter means.

5. The optical disk drive according to claim 1, wherein the disk identification means identifies whether the mounted optical disk is a first recording-capable optical disk having a first wobble frequency, or a second recording-capable optical disk having a second wobble frequency, based on the output signals from the plural filter means.

6. An optical disk drive comprising:
    a spindle motor for rotating a mounted optical disk;
    a controller for controlling a rotation speed of the spindle motor;
    an optical head for reflecting light to the optical disk, and also for receiving light reflected by the optical disk;
    a feed mechanism for shifting the optical head toward the radial direction of the optical disk;
    a wobble signal reproducer for reproducing a wobble signal of a wobble groove formed on the optical disk, based on the reflected light received by the optical head;

a frequency detector for detecting a frequency of an output signal obtained from the wobble signal reproducer and comprising plural filters for extracting frequency components corresponding to the frequencies of the plural kind of recording-capable optical disks from the output signal from the wobble signal reproducer; and a disk identifier for identifying a kind of the mounted optical disk, based on an output signal obtained from the frequency detector.

7. The optical disk drive according to claim 6, wherein the disk identifier comprises level detecting sections for detecting each of the levels of the output signals from the plural filters, and conducts identification using the detection signals from the level detecting section.

8. The optical disk drive according to claim 6, wherein the disk identifier comprises a PLL circuit to which the levels of output signals from the plural filters are supplied as reference signals, and conducts identification using the detection signals from the PLL circuit.

9. The optical disk drive according to claim 6, wherein the disk identifier identifies whether or not the mounted optical disk is a recording-capable optical disk, based on the output signals from the plural filters.

10. The optical disk drive according to claim 6, wherein the disk identifier identifies whether the mounted optical disk is a first recording-capable optical disk having a first wobble frequency, or a second recording-capable optical disk having a second wobble frequency.

11. A method for identifying an optical disk, comprising the steps of:

reproducing, in the state where a mounted optical disk is rotated at a predetermined rotation speed, a signal corresponding to a groove wobble from a predetermined position in a radial direction of the optical disk;

extracting each of plural frequency components corresponding to the frequencies of the groove wobbles of plural kinds of recording-capable optical disks; and identifying whether or not the mounted optical disk is a recording-capable optical disk, based on the extracted frequency components.

* * * * *